US006593543B2

(12) United States Patent
Benderly

(10) Patent No.: US 6,593,543 B2
(45) Date of Patent: Jul. 15, 2003

(54) GEMSTONE MARKING SYSTEM AND METHOD

(76) Inventor: David Benderly, 575 Main St., New York, NY (US) 10044

( * ) Notice: Subject to any disclaimer, the term of this patent is extended or adjusted under 35 U.S.C. 154(b) by 0 days.

(21) Appl. No.: 09/909,174

(22) Filed: Jul. 19, 2001

(65) Prior Publication Data

US 2002/0008092 A1 Jan. 24, 2002

Related U.S. Application Data

(60) Provisional application No. 60/219,475, filed on Jul. 20, 2000.

(51) Int. Cl.[7] .......... B23K 26/00

(52) U.S. Cl. .......... 219/121.68

(58) Field of Search .......... 219/121.6, 121.65, 219/121.66, 121.68, 121.69, 121.85; 427/554, 555

(56) References Cited

U.S. PATENT DOCUMENTS

| | | | |
|---|---|---|---|
| 4,515,867 A | * | 5/1985 | Bleacher et al. |
| 4,844,947 A | * | 7/1989 | Kasner et al. |
| 5,149,938 A | * | 9/1992 | Winston et al. |
| 5,573,684 A | * | 11/1996 | Winston et al. |

FOREIGN PATENT DOCUMENTS

| | | | |
|---|---|---|---|
| JP | 362110891 A | * | 5/1987 |
| JP | 406055854 A | * | 3/1994 |

* cited by examiner

*Primary Examiner*—Samuel M. Heinrich
(74) *Attorney, Agent, or Firm*—Kirschstein, et al.

(57) ABSTRACT

Diamonds are marked by applying apertured stencils bearing identifying indicia to the girdles, applying a fusible coating material over the apertured stencils, and then heating the coating material to fuse the material on the girdles. The stencils can be eliminated, and the indicia can be formed by directing a source of radiant energy at the coating material, and by moving the source and/or the girdle relative to each other.

15 Claims, 1 Drawing Sheet

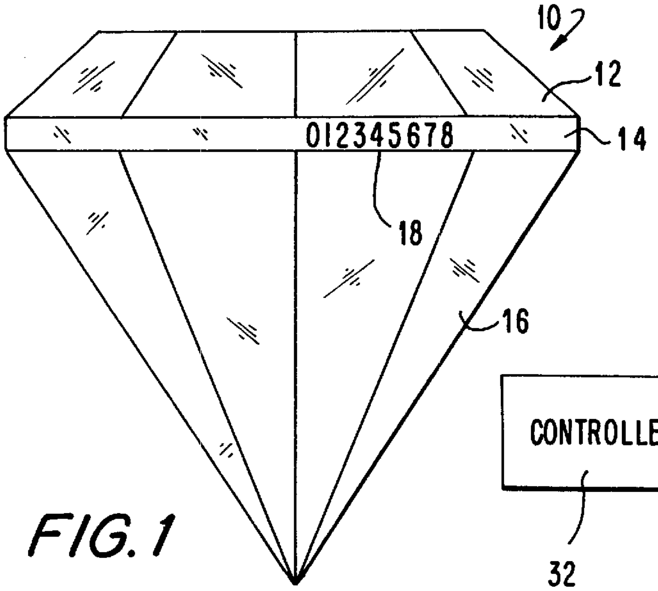
FIG. 1
FIG. 2
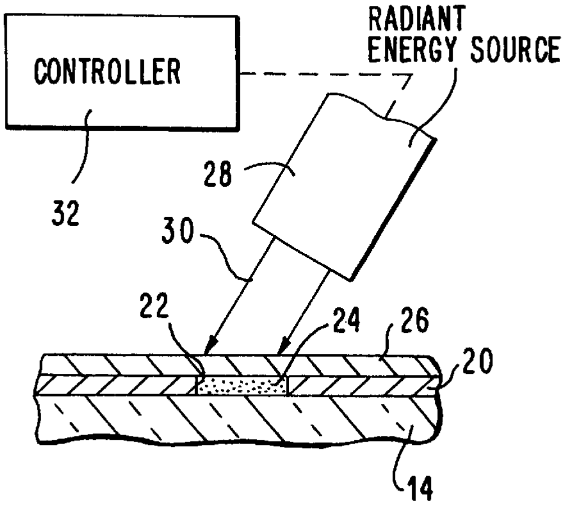
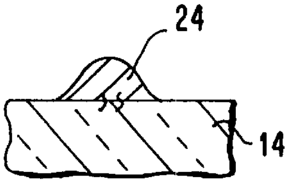
FIG. 3A
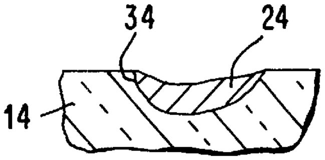
FIG. 3B
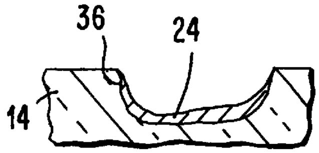
FIG. 3C
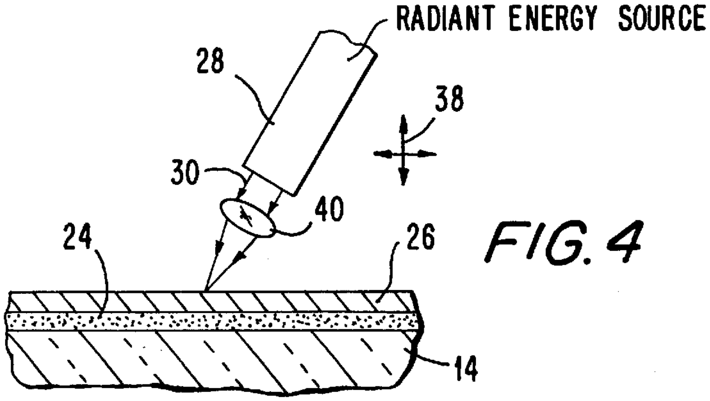
FIG. 4

GEMSTONE MARKING SYSTEM AND METHOD

CROSS REFERENCE TO RELATED APPLICATION

This application claims the benefit of U.S. Provisional Application Serial No. 60/219,475, filed Jul. 20, 2000.

BACKGROUND OF THE INVENTION

1. Field of the Invention

The present invention generally relates to marking and inscribing gemstones, particularly diamonds, with indicia identifying the gemstones by heating surface portions of the gemstones upon exposure to radiant energy in a fused marking pattern corresponding to the identifying indicia.

2. Description of the Related Art

Laser etching or inscribing of a diamond surface for the purpose of permanently identifying a diamond is well known. U.S. Pat. Nos. 4,392,476; 4,467,172; 5,753,887; 5,932,119; 6,211,484; 5,149,938; 5,410,125; 5,573,684 and U.S. patent application Ser. No. 09/785,631 filed Feb. 16, 2001 are representative of known laser marking systems that employ lasers, beam delivery and imaging components, gemstone fixtures, servomotors, optical encoders, and programmed computers for controlling the marking procedure.

Such marking systems not only occupy a large volume of space to accommodate all of their various components, but also are costly to purchase and operate. As a result, such systems are typically installed at one or more authorized sites, such as a gemological laboratory or institute. Jewelers and like customers desiring gemstones to be marked send the gemstones to the site of the marking system, and wait for the marked gemstones to be returned.

Many jewelers dislike sending precious items out of their hands and, hence, out of their sight and control, but perhaps, more importantly, dislike having to wait for their return. Yet, the size and cost of laser marking systems dictate against any one jeweler's purchasing and installing such a system at the jeweler's premises. Such systems also require skilled, trained personnel to operate the system. This requirement is typically difficult for the average jeweler to meet.

Another U.S. patent application Ser. No. 09/858,846 filed May 16, 2001, etches a diamond by igniting a flammable substance applied in a burn pattern to the diamond. This technique requires close monitoring of the flame produced after ignition to avoid the risk of fire.

SUMMARY OF THE INVENTION

OBJECTS OF THE INVENTION

One object of this invention is to enable gemstones to be marked with identifying indicia without using large sized, costly laser marking systems or flame etching systems.

Another object of this invention is to reduce the skill level required for personnel to mark gemstones.

Still another object of this invention is to enable gemstone marking on-site at a jeweler's premises.

Yet another object of this invention is to increase the use of gemstone marking by making the procedure more available and affordable and safer to jewelers.

FEATURES OF THE INVENTION

In keeping with these objects, one feature of this invention resides in a gemstone marking system and method that apply a fusible coating on a surface of a gemstone, for example, on a diamond girdle. The coating may be applied over the entire surface, or only over selected areas of the surface by use of a stencil having cutouts corresponding to identifying indicia for the diamond. A high melting point substance or mixture having a melting point greater than that of the diamond may be used for the coating. The substance or mixture is exposed to a radiant energy source and heated to fuse the coating on the surface in a marking pattern corresponding to the indicia. When the stencil is used, the substance or mixture filling all the cutouts is preferably simultaneously heated. When the stencil is not used, the energy source, preferably a laser, emits a laser beam and directs the laser beam and/or the energy source to move along the marking pattern. The marking can be performed at a jeweler's premises.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side elevational view of a marked gemstone according to this invention;

FIG. 2 is a sectional view of the process for marking the gemstone of FIG. 1 using a stencil according to this invention;

FIGS. 3A, 3B and 3C are sectional, enlarged views of the marked areas of the gemstone; and FIG. 4 is a sectional view of the process for marking the gemstone of FIG. 1 without using a stencil according to this invention.

DETAILED DESCRIPTION OF THE PREFERRED EMBODIMENTS

Reference numeral 10 in FIG. 1 schematically depicts a diamond having a crown 12, a girdle 14, and a pavilion 16. The girdle 14 is a peripheral band between the crown and the pavilion and, in the preferred embodiment, an identifying indicium or mark 18 is formed on the girdle. The mark 18 can be a machine-readable indicium, such as a one- or a two-dimensional bar code symbol, or can be a human-readable indicium, such as an alphabetical and/or numerical indicium, or can be a logo or image, for example, a certification mark of quality or of source of origin. The mark is permanent and is substantially imperceptible to the naked eye, although clearly visible under magnification such as by a ten power loupe.

In accordance with this invention, the mark is formed as follows: First, as depicted in FIG. 2, a generally planar stencil 20 having cutouts 22 is mounted on the girdle. One or both sides of the stencil may bear an adhesive layer to adhere the stencil in place on the girdle. The cutouts 22 have the same pattern as the mark 18.

The manufacture of the stencil is preferably performed not by the jeweler or ultimate user, but instead, by an authorized stencil supplier who has the facilities and equipment to make the stencil with the cutouts. Thus, a jeweler may pre-order a supply of apertured stencils, for example, with sequential numbers in a series, or with a logo, from the stencil supplier.

With the supply of apertured stencils on hand at the jeweler's premises, the jeweler selects a stencil and applies it along the girdle of a gemstone to be marked. Preferably, the stencil has an adhesive surface that adheres to the girdle.

Next, the cutouts of the stencil are filled with a fusible coating or layer 24, preferably of a high melting point material or mixture having a melting point exceeding that of the gemstone, e.g., diamond, to be marked. Preferably, the high melting point material is a metal such as tungsten, or a metal oxide material, or a ceramic material, or an alloy of such materials. The material layer may be sprayed, painted, dusted, or otherwise applied over the stencil to fill each cutout. The material layer 24 is preferably covered with a cover layer 26 that is preferably light-transmissive.

The jeweler then heats the material layer 24, typically by directing a source of radiant energy, such as a laser 28, at the cover layer 26. The laser 28 emits a laser beam 30 that is directed to the cover layer 26. The cover layer 26, if present, simply allows the emitted laser beam 30 to pass therethrough. The material layer 24 is heated and alters the girdle in dependence upon the energy level of the laser beam as adjusted by an energy controller 32.

At a relatively low energy level as depicted in FIG. 3A, the material layer 24 forms a raised bump and is fused with concomitant sublimation of the material layer 24 to the girdle 14 which may have cracks or fractures under the bump. A gel may be applied over the bump to help secure its position. At a medium energy level as depicted in FIG. 3B, there is concomitant sublimation of the material layer 24. The heat is so intense that a cavity 34 is formed in the girdle, and the material layer 24 flows into, is fused to, and substantially fills the cavity until its upper surface is generally flush with the outer surface of the girdle. At the highest energy level as depicted in FIG. 3C, a much larger cavity or crater 36 is formed by the heat from the laser beam 30, and the material layer 24 flows into, is fused to, and substantially lines or coats the interior surface of the crater. In all cases, the fused material layer 24 has a marking pattern which matches the shape of the cutouts which, of course, matches the shape of the identifying indicia or mark 18 desired.

The radiant energy source is preferably a laser, such as an excimer laser, but can by any type of laser or even a radio frequency or microwave source of radiation.

When tungsten is used for the material layer, the material layer 24 turns black after exposure to the radiation. The black or dark-colored layer 24 presents a sharp contrast against the essentially colorless diamond. Other colors are obtainable when different metal oxide materials are used in the material layer.

Rather than using a stencil, an entire exterior surface portion of the girdle can be applied or coated with the material layer 24, and be overcoated with the optional cover layer 26. Thereupon, as shown in FIG. 4, the laser beam 30 and/or the girdle 14 can be moved in the directions of the four-headed arrows 38 to directly trace the pattern of the indicia on the girdle surface portion. As before, the laser beam heats the material layer 24 at each spot where the laser beam impinges on the material layer, preferably after being focused by a focusing lens 40. The energy level of the laser beam dictates whether the girdle surface is altered as shown in FIG. 3A, B or C.

Once the gemstone is marked, a final heating step by baking the gemstone in an oven, or by exposing the gemstone to a finishing laser, may be needed.

The next step is to clean the gemstone, preferably in an acetone or acid wash. If a stencil is used, it is removed before cleaning. The resulting marked gemstone conforms to that shown in FIG. 1.

The marking can be performed on any outer surface of the gemstone, and not necessarily on the girdle. The gemstone need not necessarily be a diamond.

Thus, marking is achieved at a jeweler's premises. The skill involved in applying a stencil, then applying the high melting point material layer, then heating the material layer, and cleaning the marked gemstone, or alternatively, the skill involved in applying the material layer without a stencil, is well within the expertise of the jeweler.

It will be understood that each of the elements described above, or two or more together, also may find a useful application in other types of constructions differing from the types described above.

While the invention has been illustrated and described as embodied in a gemstone marking system and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A radiant energy marking system for marking an object, comprising:

a) a fusible coating on the object;

b) a stencil removably mounted on the object and having cutouts extending therethrough and filled with the coating when mounted on the object; and c) a radiant energy source for directing radiant energy at the coating in a pattern corresponding to indicia to be marked on the object, and for heating the coating to fuse the coating to the object to mark the indicia pattern on the object.

2. The system of claim 1, wherein the coating includes one of a metal material, a metal oxide material, a ceramic material, and an alloy of said materials.

3. The system of claim 1;

and further comprising a drive for moving the radiant energy source and the object relative to each other to trace the indicia pattern.

4. The system of claim 1, wherein the stencil has an adhesive layer for adhering to the object.

5. The system of claim 1;

and further comprising a light-transmissive cover layer overlying the coating.

6. The system of claim 1, wherein the object is a diamond having a girdle, and wherein the stencil is mounted on and along the girdle.

7. The system of claim 1, wherein the object is a diamond having a girdle; and further comprising a controller for adjusting an output energy level of the radiant energy among a low energy level in which the coating is fused and raised relative to the girdle, a medium energy level in which the coating fills a crater formed in the girdle and is generally flush with and fused to the girdle, and a high energy level in which the coating lines the crater and is below and fused to the girdle.

8. The system of claim 1, wherein the coating has a color contrasting with the object after exposure to the radiant energy.

9. A method of marking an object, comprising the steps of:

a) applying a fusible coating on the object by mounting a stencil having cutouts on the object, and filling the cutouts with the coating; and b) exposing the coating to radiant energy in a pattern corresponding to the cutouts and indicia to be marked on the object, and heating the coating to fuse the coating to the object to mark the indicia pattern on the object.

10. The method of claim 9, wherein the applying step is performed by depositing one of a metal material, a metal oxide material, a ceramic material, and an alloy of said materials on the object.

11. The system of claim 10, wherein the applying step is performed by depositing the coating as a uniform continuous layer.

12. The method of claim 10;

and further comprising the step of overlying the coating with a cover layer.

13. The method of claim 10;

and further comprising the step of moving the radiant energy source and the object relative to each other to trace the indicia pattern.

14. The method of claim 10;

and further comprising the steps of heating and cleaning the object after marking has been completed.

15. A method of marking a diamond having a girdle, comprising the steps of:

a) applying a fusible coating on the girdle;

b) exposing the coating to radiant energy in a pattern corresponding to indicia to be marked on the girdle, and heating the coating to fuse the coating to the girdle to mark the indicia pattern on the girdle; and c) adjusting an output energy level of the radiant energy among a low energy level in which the coating material is fused and raised relative to the girdle, a medium energy level in which the coating material fills a crater formed in the girdle and is generally flush with and fused to the girdle, and a high energy level in which the coating material lines the crater and is below and fused to the girdle.

* * * * *